United States Patent
Bose et al.

(10) Patent No.: US 9,389,675 B2
(45) Date of Patent: Jul. 12, 2016

(54) POWER MANAGEMENT FOR IN-MEMORY COMPUTER SYSTEMS

(71) Applicant: International Business Machines Corporation, Armonk, NY (US)

(72) Inventors: Pradip Bose, Yorktown Heights, NY (US); Alper Buyuktosunoglu, White Plains, NY (US); Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US); Augusto J. Vega, Astoria, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 14/133,861

(22) Filed: Dec. 19, 2013

(65) Prior Publication Data

US 2015/0177811 A1 Jun. 25, 2015

(51) Int. Cl.
*G06F 1/32* (2006.01)

(52) U.S. Cl.
CPC .............. *G06F 1/329* (2013.01); *G06F 1/3243* (2013.01); *G06F 1/3275* (2013.01); *G06F 1/3287* (2013.01); *Y02B 60/1228* (2013.01); *Y02B 60/1239* (2013.01); *Y02B 60/1282* (2013.01); *Y02B 60/144* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 8,006,108 B2 * | 8/2011 | Brey ..................... G06F 1/3203 713/320 |
| 2005/0138438 A1 * | 6/2005 | Bodas ................... G06F 1/3287 713/300 |
| 2005/0149937 A1 | 7/2005 | Pilkington |
| 2005/0223251 A1 * | 10/2005 | Liepe ................. H03K 19/0008 713/322 |
| 2008/0040562 A1 * | 2/2008 | Gower .................... G06F 1/206 711/154 |

(Continued)

OTHER PUBLICATIONS

Rangan et al., "Thread Motion: Fine Grained Power Management for Multi-Core Systems," ISCA 09, Jun. 2009, 12 pages.

(Continued)

*Primary Examiner* — Zahid Choudhury
(74) *Attorney, Agent, or Firm* — Cantor Colburn LLP (57) ABSTRACT

According to one embodiment, a method for power management of a compute node including at least two power-consuming components is provided. A power capping control system compares power consumption level of the compute node to a power cap. Based on determining that the power consumption level is greater than the power cap, actions are performed including: reducing power provided to a first power-consuming component based on determining that it has an activity level below a first threshold and that power can be reduced to the first power-consuming component. Power provided to a second power-consuming component is reduced based on determining that it has an activity level below a second threshold and that power can be reduced to the second power-consuming component. Power reduction is forced in the compute node based on determining that power cannot be reduced in either of the first or second power-consuming component.

14 Claims, 7 Drawing Sheets

(56) References Cited

U.S. PATENT DOCUMENTS

| | | | |
|---|---|---|---|
| 2009/0187783 A1* | 7/2009 | Hansen | G06F 1/3203 713/340 |
| 2010/0037038 A1 | 2/2010 | Bieswanger et al. | |
| 2010/0146513 A1 | 6/2010 | Song | |
| 2010/0162006 A1* | 6/2010 | Therien | G06F 9/50 713/300 |
| 2010/0332872 A1* | 12/2010 | Hanson | G06F 9/5061 713/320 |
| 2011/0035611 A1* | 2/2011 | Brey | G06F 1/3203 713/320 |
| 2011/0119514 A1* | 5/2011 | Kim | G06F 1/263 713/340 |
| 2011/0131580 A1 | 6/2011 | Krishnamurthy et al. | |
| 2012/0110352 A1* | 5/2012 | Branover | G06F 1/206 713/300 |
| 2012/0185709 A1* | 7/2012 | Weissmann | G06F 1/3234 713/320 |
| 2012/0284729 A1 | 11/2012 | Sharda et al. | |
| 2012/0324245 A1* | 12/2012 | Sinha | G06F 21/81 713/300 |
| 2013/0268791 A1* | 10/2013 | Yamana | G06F 1/3293 713/323 |
| 2014/0040643 A1* | 2/2014 | Rotem | G06F 1/3203 713/320 |
| 2014/0108830 A1* | 4/2014 | Morgan | G06F 1/3203 713/300 |
| 2014/0143570 A1* | 5/2014 | Bose | G06F 1/324 713/323 |
| 2014/0143577 A1* | 5/2014 | Nachimuthu | G06F 12/08 713/324 |
| 2014/0208136 A1* | 7/2014 | Rahardjo | G06F 1/00 713/320 |
| 2014/0351608 A1* | 11/2014 | Mozipo | G06F 1/3275 713/300 |
| 2014/0359310 A1* | 12/2014 | Haridass | G06F 9/5094 713/300 |
| 2014/0380072 A1* | 12/2014 | Lee | G06F 1/3203 713/322 |

OTHER PUBLICATIONS

Cochran et al., "Pack & Cap: Adaptive DVFS and Tread Packing Under Power Caps," Micro 11, Dec. 2011, 11 pages.

Tam et al., "Thread Clustering: Sharing-Aware Scheduling on SMP-CMP=SMT Multiprocessors," Department of Electrical and Computer Engineering, EuroSys 07, Mar. 2007, 12 pages.

Eric Saxe, "Power-Efficient Software," Jan. 2010, ACM Queue, vol. 8, pp. 1-8.

U.S. Appl. No. 13/967,419; Non-final Office Action; Date filed: Aug. 15, 2013; Date Mailed: Sep. 11, 2014; 46 pages.

U.S. Appl. No. 13/681,497; Non-Final Office Action; Date filed: Nov. 20, 2012; Date Mailed: Sep. 16, 2014; 27 pages.

Xing Fu et al., Utilization-Controlled Task Consolidation of Power Optimization in Multi-core Real-Time Systems, IEEE, Embedded and Real-Time Computing Systems and Applications (RTCSA, Aug. 2011 IEEE 17th International Conference, vol. 1, pp. 73-82.

* cited by examiner

POWER MANAGEMENT FOR IN-MEMORY COMPUTER SYSTEMS

BACKGROUND

The present invention relates generally to computer systems, and more particularly to power management in a computer system.

In computer systems that include multiple processing resources for executing a plurality of tasks, distribution of task execution is important to system performance. In systems having multiple processor cores and multi-threading operation, allocation of tasks or threads among cores can affect latency and/or power consumption. Systems that include additional processing resources in combination with processor cores place additional burdens on power management and overall computer system performance. Power management can impact overall computer system operating costs, processing system responsiveness, and expected operating life of individual components or subsystems.

SUMMARY

According to one embodiment, a method for power management of a compute node including at least two power-consuming components is provided. A power capping control system of the compute node determines a power consumption level of the compute node. The power capping control system compares the power consumption level to a power cap. Based on determining that the power consumption level is greater than the power cap, a plurality of actions are performed including: reducing power provided to a first power-consuming component of the compute node based on determining that the first power-consuming component has an activity level below a first threshold and that power can be reduced to the first power-consuming component. Power provided to a second power-consuming component of the compute node is reduced based on determining that the second power-consuming component has an activity level below a second threshold and that power can be reduced to the second power-consuming component. Power reduction is forced in the compute node based on determining that power cannot be reduced in either of the first or second power-consuming component just based on low activity.

According to another embodiment, a power capping control system of a compute node including at least two power-consuming components is provided. The power capping control system includes a power monitor configured to determine a power consumption level of the compute node. The power capping control system also includes a power capping control configured to compare the power consumption level to a power cap, and based on a determination that the power consumption level is greater than the power cap, the power capping control is further configured to perform a number of actions. Power provided to a first power-consuming component of the compute node is reduced based on determining that the first power-consuming component has an activity level below a first threshold and that power can be reduced to the first power-consuming component. Power provided to a second power-consuming component of the compute node is reduced based on determining that the second power-consuming component has an activity level below a second threshold and that power can be reduced to the second power-consuming component. Power reduction is forced in the compute node based on determining that power cannot be reduced in either of the first or second power-consuming component.

DETAILED DESCRIPTION

An embodiment is directed to a computer system with a multi-core processing chip and one or more accelerator chips. In embodiments, the computer system is configured to perform power management. The accelerator chips each include accelerator units or elements configured to execute tasks or threads that are assigned by a main processor (e.g., the multi-core processing chip) of a system. In one embodiment, the multi-core processing chip is a multi-thread enabled chip, where each core can support one or more software threads executing simultaneously in the core. In an embodiment, the accelerator chips are active memory devices. In embodiments, a compiler, located in the computer system or external to the system, receives an application and provides an executable module for execution on the multi-core processing chip and one or more accelerator chips. In embodiments, the executable module includes a first portion of code to be executed on cores of the multi-core processing chip and a second portion of code to be executed on accelerator units of the accelerator chip.

In an embodiment, an application, such as an executable module, runs on an operating system (OS), where the application uses software threads for execution of the application, where the software threads are mapped to cores in the multi-core processing chip. One or more of the software threads may then off-load tasks to one or more available accelerator units in the accelerator chip. In embodiments where software threads off-load tasks to accelerator units, the software threads wait in the multi-core processing chip for the off-loaded accelerator tasks to complete. A control module in the OS may consolidate software thread execution in cores of the multi-core processing chip, where threads may be reassigned from one core to another core, thus creating an idle core that activates a power savings mode to reduce power consumption. In another embodiment, the control module can identify threads having one or more common characteristics running in different cores of the multi-core processing chip, and combine threads having one or more common characteristics into a same core of the multi-core processing chip. For example, threads having a high level of activity can be combined in one core, threads having a lower level of activity can be combined in another core, and idle threads can be combined in another core, where each core may have different operating frequencies or voltage levels for per core power optimization.

In one embodiment, a computer system includes a multi-core processing chip and an OS. The computer system is configured to perform a power management. In embodiments, a compiler receives an application and provides an executable module or application for execution by the multi-core processing chip. In an embodiment, an application, such as an executable module, runs on the OS, where the application has software threads that are mapped to cores in the multi-core processing chip. In an embodiment, a control module in the OS may consolidate software threads in fewer cores to as part of power capping and/or power shifting. In addition, by consolidating thread execution in cores of the multi-core processing chip, threads are reassigned from one core to another core. In an embodiment, a core that loses threads to another core during consolidation may become an idle core that activates a power savings mode to reduce power consumption in the system. In addition, when a first hardware thread hosting a software thread in a physical core loses the software thread to a second hardware thread in a separate core, the thread consolidation causes the first hardware thread to become idle. In embodiments where all the hardware threads in one core become idle, the core is idle and can be switched to a power savings mode.

An embodiment is directed to a computer system including a memory device, such as an active memory device. The memory device may be any suitable memory device including one or more memory device (e.g., random access memory "RAM" chips) connected to a hub chip (also referred to as a memory controller chip) configured to control the memory device. In an embodiment, the active memory device includes layers of memory that form a three dimensional ("3D") memory device (also referred to as "memory cube") where individual columns of memory chips form stacks or vaults in communication with the hub chip. In one embodiment, a plurality of memory stacks is located on a memory module, where each stack has an associated hub chip. The hub chips may include a processing element configured to communicate with the memory and other processing elements in other hub chips. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller.

Embodiments include a memory stack with a processing element and memory controller in the hub chip, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

Figure 1:
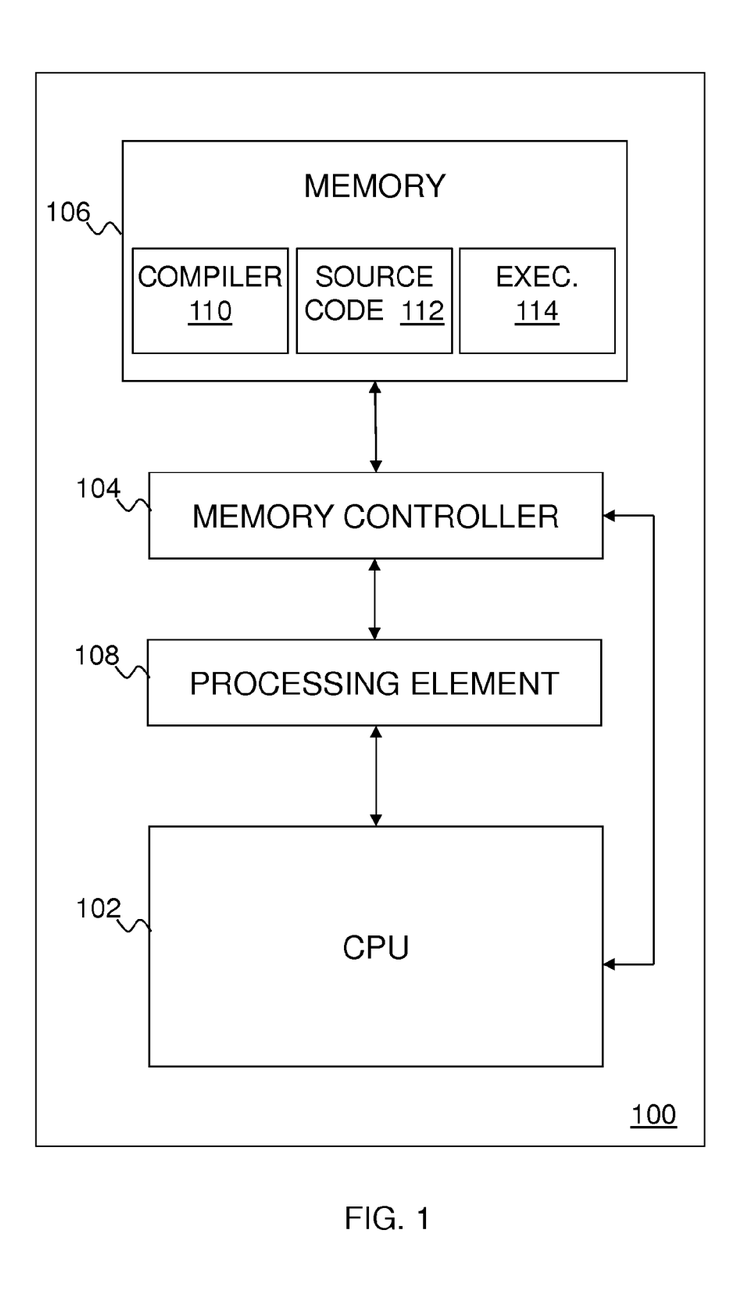
FIG. 1 illustrates a block diagram of a system in accordance with an embodiment.

FIG. 1 illustrates a block diagram of a system with a memory device accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106. In an embodiment, the memory controller 104 and processing element 108 may be referred to as a hub chip. The system 100 may also be referred to as a compute node.

In one embodiment, the memory 106 and memory controller 104 are coupled to the computer processor 102 and process write requests from the computer processor 102. In one example, the write requests contain data to be written to the memory 106 and a memory location of the instruction(s), where the instruction forms a virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, a command from the computer processor 102 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory 106.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. Further, embodiments may include fewer devices than depicted. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

The memory 106 may store one or more separate programs, each of which comprises an ordered listing of executable instructions for implementing logical functions. For example, software stored in the memory 106 may include an operating system and/or hypervisor (not shown), source code 112, and one or more applications. As shown in FIG. 1, the memory 106 stores source code 112 and a compiler 110. The compiler 110 may alternatively be stored and executed on a system that is external to the system 100 for which it produces executable programs, such as executable 114. The compiler 110 includes numerous functional components for implementing the features, processes, methods, functions, and operations of the exemplary embodiments, as will be described further herein. Optimized code is executed in a runtime environment (not shown) of the system 100.

The applications may include source code 112, executable program (object code), script, or any other entity comprising a set of instructions to be performed. When the application is source code 112, the program code is translated via the compiler 110 to the executable 114.

Figure 2:
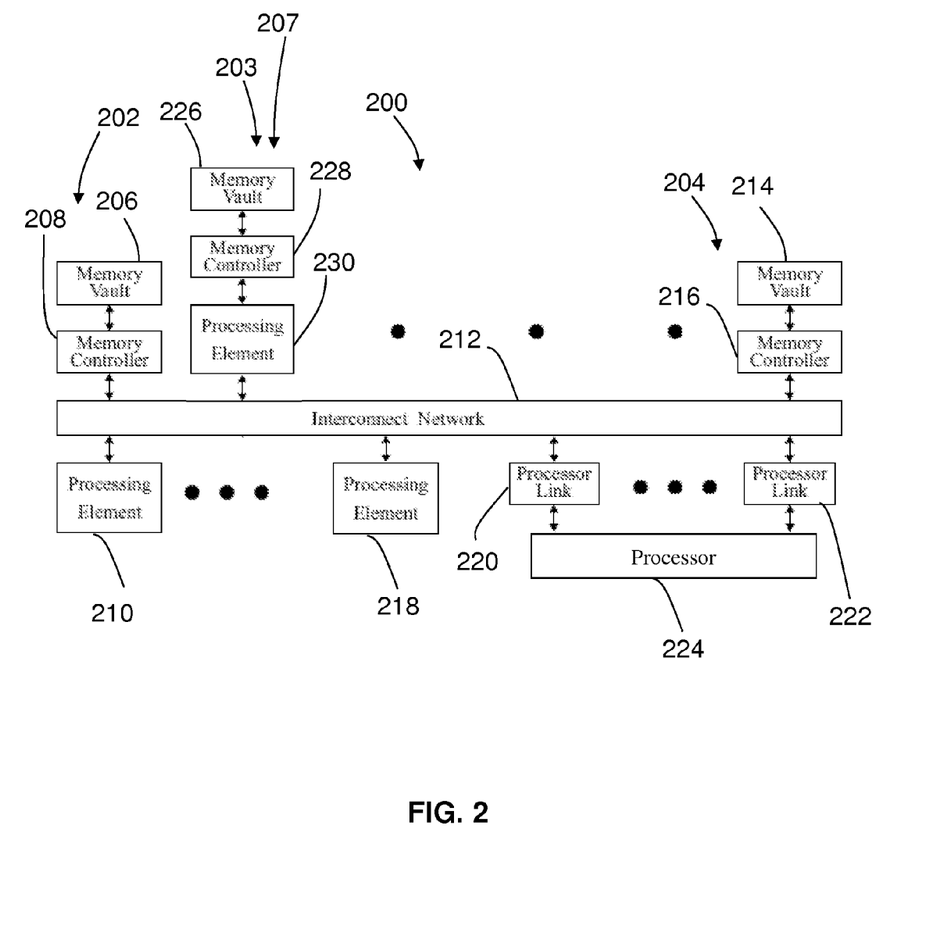
FIG. 2 illustrates a block diagram of a compute node in accordance with an embodiment.

FIG. 2 is a schematic diagram of an embodiment of a compute node 200 with power management as an example of an in-memory computer system. In one embodiment, the compute node 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220-222. The interconnect network 212 provides a fast and high bandwidth path for communication between portions of the compute node 200, such as processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory device 204 includes a memory vault 214 and memory controller 216 coupled to processing elements 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another.

A combination of a memory stack, such as memory vault 226, and a hub chip that includes memory controller 228 and processing element 230 forms a lane 207. The compute node 200 can include multiple lanes 207 which may be independently turned on and off as part of power management. A computer system can include multiple instances of the compute node 200 and each compute node 200 can include multiple lanes 207. Additionally, an active memory device can include multiple lanes 207, which may be arranged to form an active memory cube.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing elements, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

Figure 3:
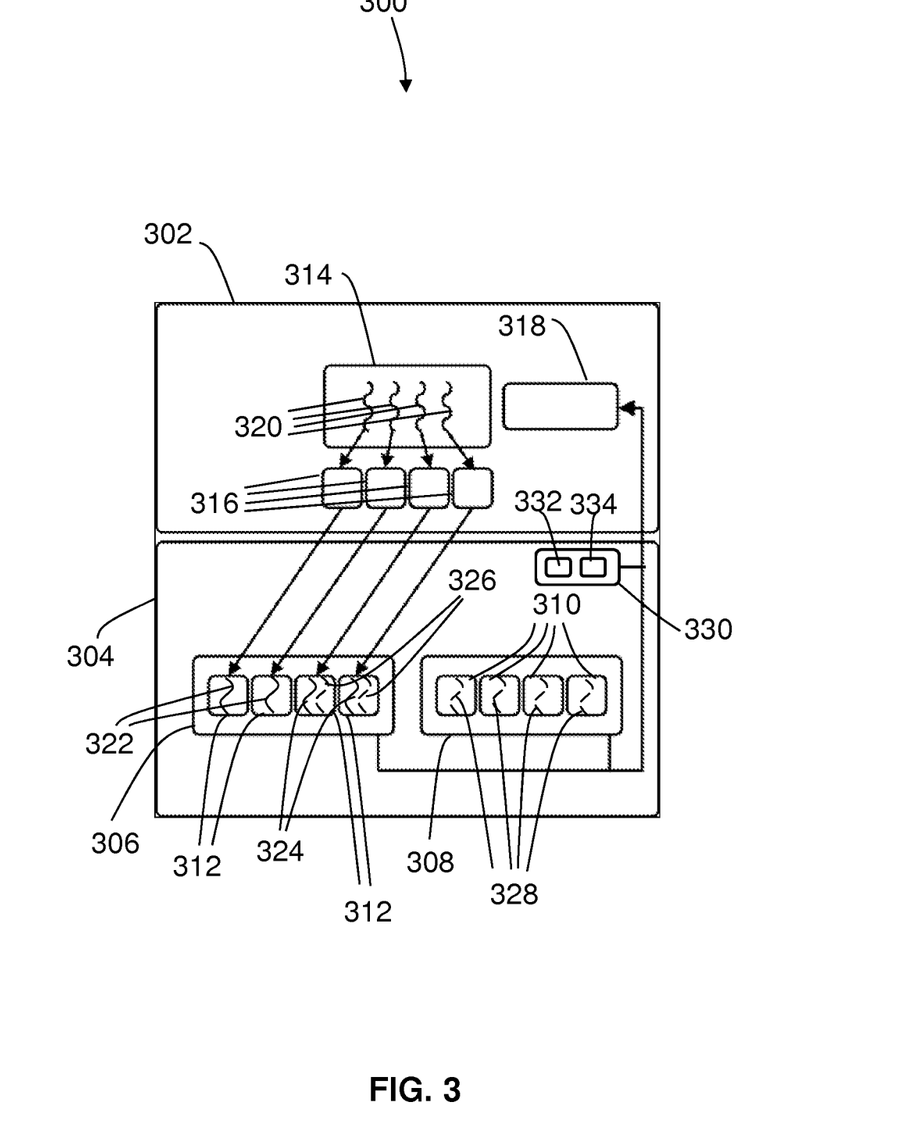
FIGS. 3 and 4 are block diagrams of a computer system configured to perform thread consolidation in accordance with an embodiment.
Figure 4:
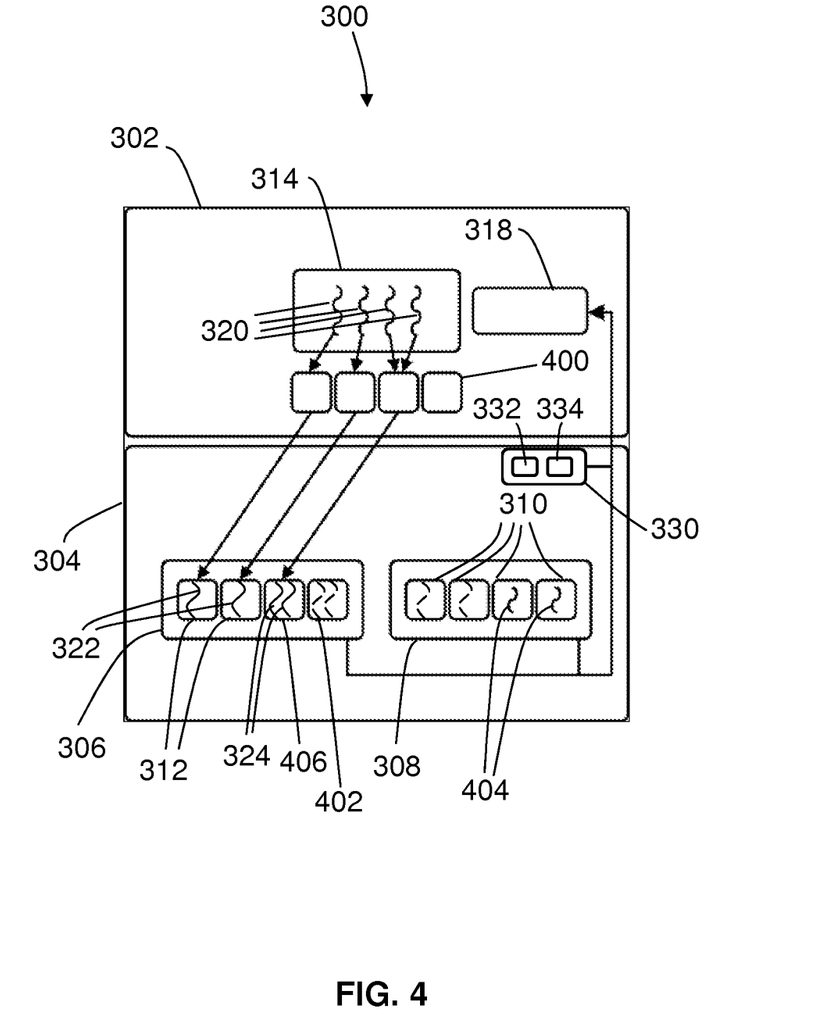

FIGS. 3 and 4 are block diagrams of a computer system 300 with power management according to an embodiment. The computer system 300 includes an operating system (OS) 302 and a compute node 304. The compute node 304 is an example of a system hardware that includes a multi-core processing chip 306 and accelerator chip 308. The compute node 304 can also include a power capping control system 330 with a power monitor 332 configured to determine a power consumption level of the compute node 304, and a power capping control 334 configured to compare the power consumption level to a power cap. In an alternate embodiment, the power capping control system 330 is incorporated in a control module 318 of the OS 302 or in a hypervisor (not depicted). The multi-core processing chip 306 and accelerator chip 308 are examples of at least two power-consuming components that are monitored and controlled by the power capping control system 330.

In an embodiment, the multi-core processing chip 306 has a plurality of physical cores 312 where the cores each have one or more hardware threads capable of receiving and executing corresponding software threads. The accelerator chip 308 includes accelerator units 310 where the accelerator units can execute software threads or tasks created and assigned by other software threads executing in the multi-core processing chip 306. In an embodiment, the accelerator chip 308 includes one or more processing elements of an active memory device and the multi-core processing chip 306 is a main processor, such as those described in FIGS. 1 and 2. In an embodiment, accelerator units 310 are units coupled to a processing device (e.g., main processor) that receive tasks or threads for execution to accelerate execution of an application. Accordingly, the accelerator units 310 in the accelerator chip 308 are processing elements in the active memory device configured to execute threads or tasks assigned by other software threads executing in the multi-core processing chip.

In an embodiment, the OS 302 also includes application 314 utilizing software threads 320 to execute code. The control module 318 maps or assigns software threads 320 from the application 314 to physical cores 312 configured to execute the threads. In embodiments, the software threads 320 are mapped to logical cores 316 in the OS 302, where the logical cores are then mapped to corresponding physical cores 312. Accordingly, hardware threads 322 and 324 in the physical cores 312 receive the software threads 320 and begin execution of the threads. In embodiments, physical cores 312 and accelerator units 310 each have one or more hardware threads that are configured to receive and execute threads from an application, such as software threads 320. In an embodiment described below, the accelerator units 310 receive child threads spawned by parent threads executing in physical cores 312. As discussed herein, physical cores, accelerator units and hardware threads that have not received threads or are not executing threads may be referred to as idle. In an embodiment, the control module 318 obtains hardware-level execution information (e.g., performance counters, power consumption, temperature, etc.) from the multi-core processing chip 306 and the accelerator chip 308. In an embodiment, the control module 318 can relocate software threads between cores 312 in the multi-core processing chip 306 and between accelerator units 310 in the accelerator chip 308.

In an embodiment, one or more of the hardware threads 324 executes a software thread and initiates one or more child threads 404 to execute on the accelerator units 310. In embodiments, cores may have a plurality of hardware threads, where a portion of the hardware threads are idle while other hardware threads execute a software thread. Accordingly, idle hardware threads 326 on the physical cores 312 allow for consolidation of executing software threads in the multi-core processing chip 306. Specifically, software threads 320 are combined to execute on a consolidated physical core 406 (FIG. 4), where an idle hardware thread 326 in a first physical core 401 receives a software thread executing in a hardware thread 324 in a second physical core 402 to be idle. The consolidated physical core 406 is a physical core hosting a thread that is "reassigned" from a second physical core, where the second physical core may become idle after losing the reassigned thread. A corresponding logical core 400 is also idle and unused. In an embodiment, a power savings mode is activated for the physical core 402, where the power savings mode reduces power consumption in the computer system 300. In one embodiment, the thread consolidation and power savings mode is a mode where the physical core 402 operates with a clock and/or signals at a lower frequency and/or voltage. In another embodiment, a portion of the components in the physical core 402 is powered down in the power savings mode. As a further option, the chip frequency of the multi-core processing chip 306 can be reduced to lower power consumption after consolidation.

In an embodiment, one or more of the threads executing on hardware threads 324 is mapped or assigned to execute on one or more of the idle hardware threads 328 in the accelerator units 310. Following the mapping of threads for execution on the accelerator chip 308, one or more software threads executing in hardware threads 322, 324 may be consolidated resulting in the idle core 402 and the consolidated physical core 406. The core 402 then activates the power savings mode to reduce power consumption.

In an embodiment, the computer system 300 provides thread consolidation during execution of an application to reduce power consumption. In embodiments, the computer system 300 and control module 318 with thread consolidation considers power consumption and application performance to guide thread assignment and consolidation actions. The control module 318 can collaborate with the power capping control system 330 to make decisions impacting power management. In addition, the control module 318 and/or power capping control system 330 may consider several factors when assigning threads between physical cores and accelerator units, such as the number of available hardware threads within accelerator units and the execution time for threads currently executing in the accelerator units. Other inputs during consolidation include the number of idle threads on the multi-core processing chip 306 and the number and length of long-latency stall events. In an embodiment, the thread consolidation can enhance performance and efficiency by consolidating two or more threads on a single physical core. In addition, information relating to a thread's execution may be provided to the control module 318 and/or the power capping control system 330 by the compiler 110 of FIG. 1, where this information is an input to a determination of which threads to consolidate and when to consolidate them. Specifically, the compiler 110 of FIG. 1 can indicate that a particular software thread executing in a hardware thread 324 may spawn a long-duration task to execute in the accelerator units 310, where consolidation of that software thread would improve efficiency.

Figure 5:
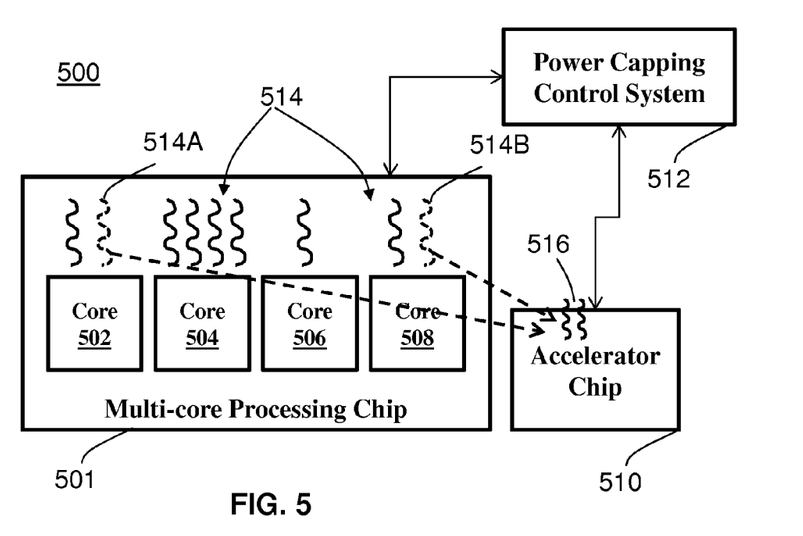
FIGS. 5 and 6 are block diagrams of a compute node configured to perform thread herding in accordance with another embodiment.
Figure 6:
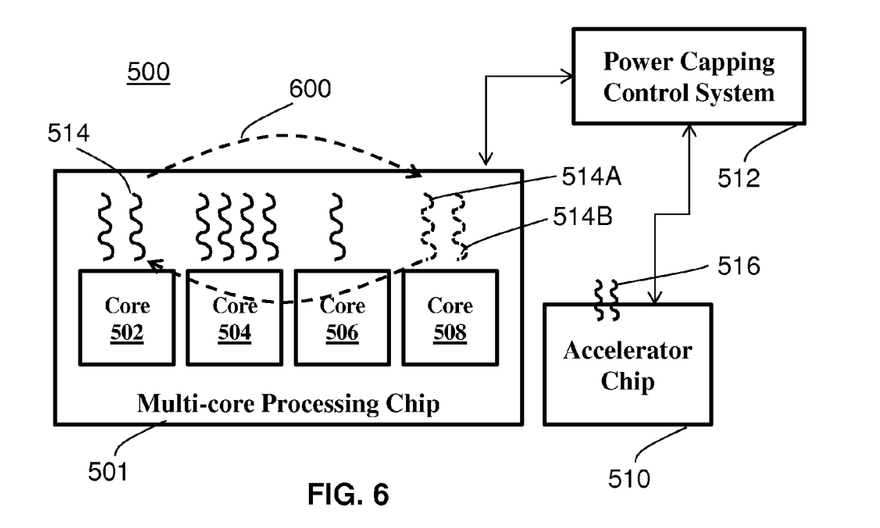

FIGS. 5 and 6 are block diagrams of a compute node 500 configured to perform thread herding in accordance with another embodiment. In the example of FIGS. 5 and 6, the compute node 500 includes a multi-core processing chip 501 with cores 502, 504, 506, and 508. The compute node 500 also includes an accelerator chip 510 and a power capping control system 512. The multi-core processing chip 501 is an embodiment of the multi-core processing chip 306 of FIGS. 3 and 4, and the accelerator chip 510 is an embodiment of the accelerator chip 308 of FIGS. 3 and 4, e.g., an active memory device. The power capping control system 512 is an embodiment of the power capping control system 330 of FIGS. 3 and 4. The power capping control system 512 may work in conjunction with or be integrated with the control module 318 of FIGS. 3 and 4. A number of threads 514 can execute on the cores 502-508. In an embodiment, the power capping control system 512 identifies threads 514 having one or more common characteristics running in different cores 502-508 of the multi-core processing chip 501. For example, activity level monitoring can be performed on a thread and core basis to identify and categorize threads in different groups. Threads 514 that exhibit a high level of activity may be grouped or "herded" into one or more of the cores 502-508, threads 514 that exhibit a lower level of activity, e.g., 50% activity, can be grouped into one or more other cores 502-508, and idle threads can be grouped into another core 502-508. Characterization of threads can be performed based on analyzing activity level or through the use of flags or "hints" provided by the compiler 110 of FIG. 1.

As one example, when threads 514A and 514B on cores 502 and 508 spawn child threads 516 in the accelerator chip 510, the threads 514A and 514B have low activity while waiting for the child threads 516 to complete. The threads 514A and 514B can be herded together such that a higher activity thread 514 is moved from core 508 to core 502 and thread 514A is moved from core 502 to core 508. Once core 508 contains only low activity or idle threads 514A and 514B, the core frequency of core 508 can be reduced to lower power consumption. Accordingly, the threads 514A and 514B having one or more common characteristics are herded into the same core 508 of the multi-core processing chip 501, and power management is performed on a per core basis responsive to herding 600.

Figure 7:
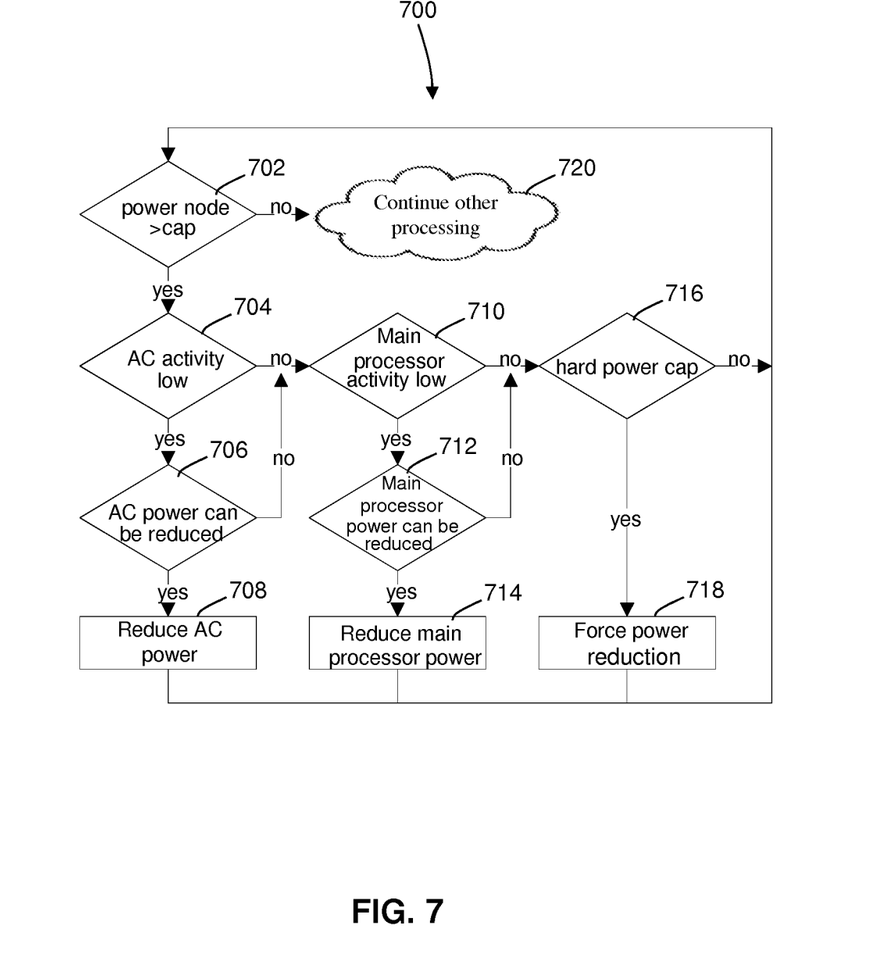
FIG. 7 is a process flow diagram for power capping in a computer system in accordance with an embodiment.

FIG. 7 is a process flow diagram for power capping in a computer system in accordance with an embodiment. A process 700 of FIG. 7 can be performed by a power capping control system, such as the power capping control system 330 of FIGS. 3 and 4 or the power capping control system 512 of FIGS. 5 and 6. At block 702, a power capping control system of a compute node determines a power consumption level of the compute node. The power capping control system compares the power consumption level to a power cap. Power determination may be performed, for example, by the power monitor 332 and the power capping control 334 of FIGS. 3 and 4.

At block 704, based on determining that the power consumption level is greater than the power cap, an activity level of a first power-consuming component is checked. The first power-consuming component can be the accelerator chip 308 or 510 of FIGS. 3-6, which may be an active memory device as previously described. If the first power-consuming component has an activity level below a first threshold, at block 706 it is determined whether power can be reduced to the first power-consuming component. The first threshold can be a configurable value. As one example, the first threshold can be set to a value of about 50%. The compiler 110 of FIG. 1 can provide a flag or hint to indicate that utilization of the accelerator chip 308 or 510 will increase in the near term, in which case the power cannot be reduced. Alternatively, the control module 318 of FIGS. 3-4 may provide an indication as to whether the power can be reduced to the first power-consuming component.

At block 708, based on determining that power can be reduced to the first power-consuming component, power to the first power-consuming component is reduced, and the process 700 returns to block 702.

At block 710, based on determining that the first power-consuming component does not have an activity level below the first threshold or that power cannot be reduced to the first power-consuming component, an activity level of a second power-consuming component is checked. The second power-consuming component may be the multi-core processing chip 306 or 501 of FIGS. 3-6. If the second power-consuming component has an activity level below a second threshold, at block 712 it is determined whether power can be reduced to the second power-consuming component. The second threshold can be a configurable value. As one example, the second threshold can be set to a value of about 50%. The compiler 110 of FIG. 1 can provide a flag or hint to indicate that utilization of the multi-core processing chip 306 or 501 will increase in the near term, in which case the power cannot be reduced. Alternatively, the control module 318 of FIGS. 3-4 may provide an indication as to whether the power can be reduced to the second power-consuming component.

At block 714, based on determining that power can be reduced to the second power-consuming component, power to the second power-consuming component is reduced, and the process 700 returns to block 702.

At block 716, based on determining that the second power-consuming component does not have an activity level below the second threshold or that power cannot be reduced to the second power-consuming component, a hard power cap is checked. At block 718, if a hard power cap is enabled, a power reduction is forced in the compute node based on determining that power cannot be reduced in either of the first or second power-consuming component. The process 700 returns to block 702 and the process 700 may be repeated if the power consumption level is greater than the power cap; otherwise, at block 720 other processing can be performed.

When the first power-consuming component is an active memory device, reducing power provided to the first power-consuming component may comprise turning off one or more lanes, such as lanes 207 of FIG. 2. When the second power-consuming component is a multi-core processing chip, reducing power provided to the second power-consuming component can include performing either or both of: consolidating threads into a fewer number of cores in the multi-core processing chip, and turning off unused cores; and reducing a chip frequency of the multi-core processing chip. Reducing power provided to the second power-consuming component can include identifying threads having one or more common characteristics running in different cores of the multi-core processing chip, herding the threads having one or more common characteristics into a same core of the multi-core processing chip, and performing power management on a per core basis responsive to the herding. Determining whether to reduce power provided to the active memory device can be performed prior to determining whether to reduce power provided to the multi-core processing chip. Forcing the power reduction in the compute node can include unscheduling at least one task in either or both of the active memory device and the multi-core processing chip.

Figure 8:
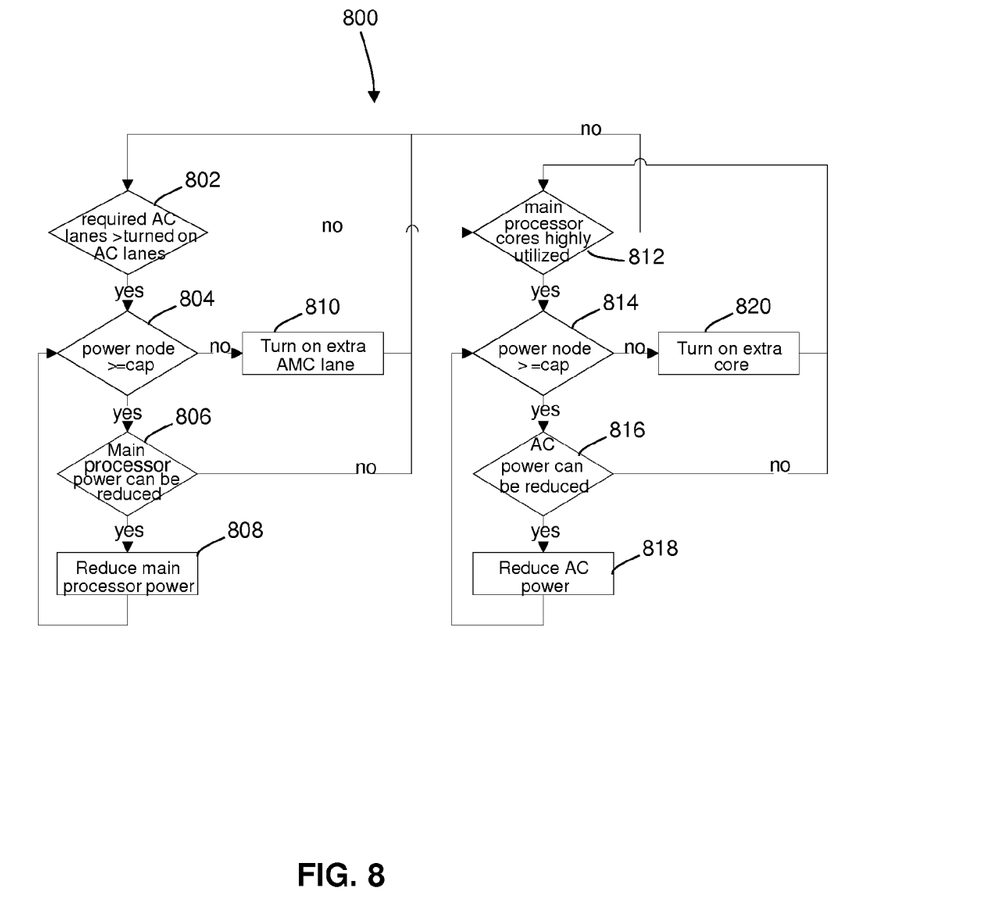
FIG. 8 is a process flow diagram for power shifting in a computer system in accordance with an embodiment.

FIG. 8 is a process flow diagram for power shifting in a computer system in accordance with an embodiment. A process 800 of FIG. 8 can be performed by a power capping control system such as the power capping control system 330 of FIGS. 3 and 4 or the power capping control system 512 of FIGS. 5 and 6 for an active memory device and a multi-core processing chip. At block 802, a comparison of a number of required lanes to a number of turned-on lanes is performed. The number of required lanes may be based on determining how many lanes, such as lanes 207 of FIG. 2, are presently active and a level of utilization of the active lanes. At block 804, based on determining that the number of required lanes is greater than the number of turned-on lanes, it is determined whether a power consumption level is greater than or equal to the power cap. Power determination may be performed, for example, by the power monitor 332 and the power capping control 334 of FIGS. 3 and 4. If the power consumption level is greater than or equal to the power cap, it is determined whether power can be reduced to the multi-core processing chip at block 806. If power can be reduced to the multi-core processing chip, then at block 808 power to the multi-core processing chip is reduced; otherwise, the process 800 returns to block 802. If at block 804 it is determined that the power consumption level is less than the power cap, an extra lane is turned on at block 810, and the process 800 returns to block 802.

At block 802, based on determining that the number of required lanes is not greater than the number of turned-on lanes, it is determined whether turned-on cores of the multi-core processing chip are highly utilized at block 812. Core utilization may be determined by monitoring activity per core and/or scheduled activity per core, for example via the control module 318 of FIGS. 3-4. At block 812, based on determining that turned-on cores of the multi-core processing chip are highly utilized, it is determined whether the power consumption level is greater than or equal to the power cap at block 814. Power determination may be performed, for example, by the power monitor 332 and the power capping control 334 of FIGS. 3 and 4. Based on determining that the power consumption level is greater than or equal to the power cap at block 814 and that power can be reduced to the active memory device at block 816, power to the active memory device is reduced at block 818. Based on determining that the turned-on cores of the multi-core processing chip are highly utilized at block 812 and that the power consumption level is less than the power cap at block 814, an extra core of the multi-core processing chip can be turned on at block 820. Alternatively, based on determining that the turned-on cores of the multi-core processing chip are highly utilized and that the power consumption level is less than the power cap, a chip frequency of the multi-core processing chip can be raised.

Technical effects and benefits include systems and methods that provide reduced latency and power consumption by using power capping and/or power shifting between power-consuming components. In particular, where the power-consuming components are an active memory device and a multi-core processing chip, power and activity levels can drive changes in the number of lanes and/or cores turned on as well as changes in operating frequency at a core or chip level. Thread consolidation or thread herding can be used to redistribute active threads between cores such that a reduced number of cores are fully active and operating at a higher frequency.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for power management of a compute node comprising at least two power-consuming components, the method comprising:
    determining, by a power capping control system of the compute node, a power consumption level of the compute node;
    comparing, by the power capping control system, the power consumption level to a power cap; and
    based on determining that the power consumption level is greater than the power cap:
        reducing power provided to a first power-consuming component of the compute node based on determining that the first power-consuming component has an activity level below a first threshold and that power is reducible to the first power-consuming component, wherein the first power-consuming component is an active memory device comprising a plurality of memory stacks associated with hub chips comprising processing elements that form lanes and reducing power provided to the first power-consuming component comprises turning off one or more of the lanes;
        reducing power provided to a second power-consuming component of the compute node based on determining that the second power-consuming component has an activity level below a second threshold and that power is reducible to the second power-consuming component, wherein the second power-consuming component is a multi-core processing chip; and
        forcing a power reduction in the compute node based on determining that power cannot be reduced in either of the first or second power-consuming component; and
    performing power shifting between the active memory device and the multi-core processing chip by:
        comparing a number of required lanes to a number of turned-on lanes;
        based on determining that the number of required lanes is greater than the number of turned-on lanes, that the power consumption level is greater than or equal to the power cap, and that power is reducible to the multi-core processing chip, reducing power to the multi-core processing chip; and
        based on determining that the number of required lanes is greater than the number of turned-on lanes and that the power consumption level is less than the power cap, turning on an extra lane.

2. The method of claim 1, wherein reducing power provided to the second power-consuming component comprises performing either or both of:
    consolidating threads into a fewer number of cores in the multi-core processing chip, and turning off unused cores; and
    reducing a chip frequency of the multi-core processing chip.

3. The method of claim 1, wherein reducing power provided to the second power-consuming component comprises:

identifying threads having one or more common characteristics running in different cores of the multi-core processing chip;

herding the threads having one or more common characteristics into a same core of the multi-core processing chip; and performing power management on a per core basis responsive to the herding.

4. The method of claim 1, wherein determining whether to reduce power provided to the active memory device is performed prior to determining whether to reduce power provided to the multi-core processing chip.

5. The method of claim 1, wherein forcing the power reduction in the compute node comprises unscheduling at least one task in either or both of the active memory device and the multi-core processing chip.

6. The method of claim 1, further comprising:
based on determining that turned-on cores of the multi-core processing chip are highly utilized, that the power consumption level is greater than or equal to the power cap, and that power is reducible to the active memory device, reducing power to the active memory device; and based on determining that the turned-on cores of the multi-core processing chip are highly utilized and that the power consumption level is less than the power cap, turning on an extra core of the multi-core processing chip.

7. The method of claim 1, further comprising:
based on determining that the turned-on cores of the multi-core processing chip are highly utilized and that the power consumption level is less than the power cap, raising a chip frequency of the multi-core processing chip.

8. A power capping control system of a compute node comprising at least two power-consuming components, the power capping control system comprising:

a power monitor configured to determine a power consumption level of the compute node;

a power capping control configured to compare the power consumption level to a power cap, and based on a determination that the power consumption level is greater than the power cap, the power capping control is further configured to:

reduce power provided to a first power-consuming component of the compute node based on determining that the first power-consuming component has an activity level below a first threshold and that power is reducible to the first power-consuming component, wherein the first power-consuming component is an active memory device comprising a plurality of memory stacks associated with hub chips comprising processing elements that form lanes and reducing power provided to the first power-consuming component comprises turning off one or more of the lanes;

reduce power provided to a second power-consuming component of the compute node based on determining that the second power-consuming component has an activity level below a second threshold and that power is reducible to the second power-consuming component, wherein the second power-consuming component is a multi-core processing chip; and force a power reduction in the compute node based on determining that power cannot be reduced in either of the first or second power-consuming component; and the power capping control is further configured to perform power shifting between the active memory device and the multi-core processing chip by:

comparing a number of required lanes to a number of turned-on lanes;

based on determining that the number of required lanes is greater than the number of turned-on lanes, that the power consumption level is greater than or equal to the power cap, and that power is reducible to the multi-core processing chip, reducing power to the multi-core processing chip; and based on determining that the number of required lanes is greater than the number of turned-on lanes and that the power consumption level is less than the power cap, turning on an extra lane.

9. The power capping control system of claim 8, wherein reduction of power provided to the second power-consuming component comprises either or both of:

consolidation of threads into a fewer number of cores in the multi-core processing chip, and turning off unused cores; and reduction of a chip frequency of the multi-core processing chip.

10. The power capping control system of claim 8, wherein reduction of power provided to the second power-consuming component comprises:

identifying threads having one or more common characteristics running in different cores of the multi-core processing chip;

herding the threads having one or more common characteristics into a same core of the multi-core processing chip; and performing power management on a per core basis responsive to the herding.

11. The power capping control system of claim 8, wherein determining whether to reduce power provided to the active memory device is performed prior to determining whether to reduce power provided to the multi-core processing chip.

12. The power capping control system of claim 8, wherein forcing the power reduction in the compute node comprises unscheduling at least one task in either or both of the active memory device and the multi-core processing chip.

13. The power capping control system of claim 8, wherein the power capping control is further configured to perform:

based on determining that turned-on cores of the multi-core processing chip are highly utilized, that the power consumption level is greater than or equal to the power cap, and that power is reducible to the active memory device, reducing power to the active memory device; and based on determining that the turned-on cores of the multi-core processing chip are highly utilized and that the power consumption level is less than the power cap, turning on an extra core of the multi-core processing chip.

14. The power capping control system of claim 8, wherein the power capping control is further configured to perform:

based on determining that the turned-on cores of the multi-core processing chip are highly utilized and that the power consumption level is less than the power cap, raising a chip frequency of the multi-core processing chip.

* * * * *